Feb. 1, 1944.                B. BARÉNYI                 2,340,503
                      DISENGAGEABLE CONNECTION
                        Filed Dec. 3, 1940
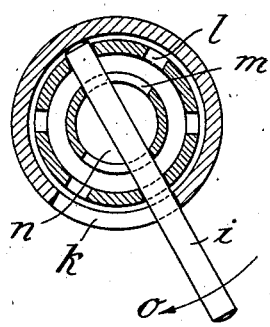
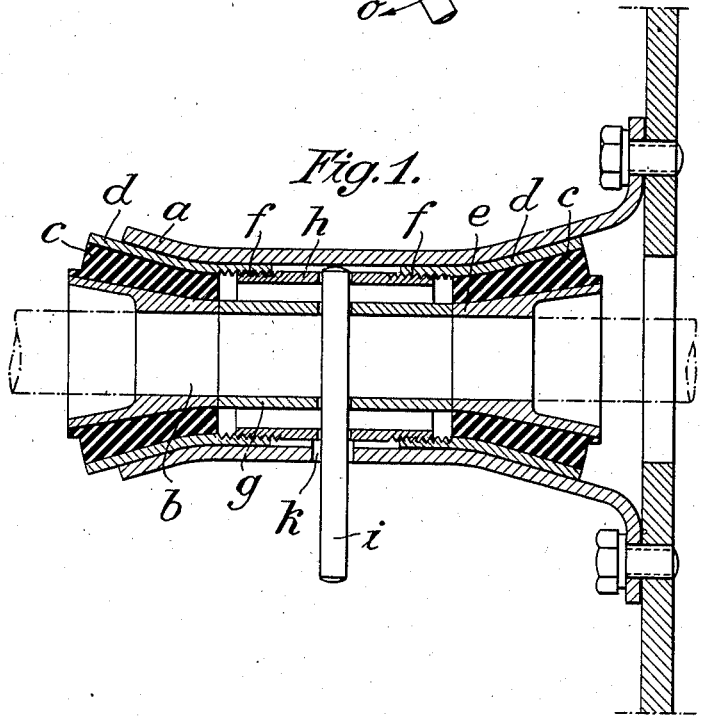
INVENTOR
BÉLA BARÉNYI
BY
Haseltine, Lake & Co.
ATTORNEYS Patented Feb. 1, 1944

2,340,503

UNITED STATES PATENT OFFICE 2,340,503

DISENGAGEABLE CONNECTION

Béla Barényi, Boblingen, Germany; vested in the Alien Property Custodian

Application December 3, 1940, Serial No. 368,292
In Germany December 5, 1939

7 Claims. (Cl. 308—26)

The present invention relates to disengageable connections and more particularly refers to devices adapted to disengageably connect two conical rubber-metal bushings.

Devices for connecting together two portions are well known in which an internal and an external portion together with interposed cylindrical or conical rubber bushings resiliently are borne against each other. For instance such resilient bearings have been provided for connecting aggregates of axes of motor vehicles to the frame of the latter.

Now, the present invention relates to disengageable connections for connecting two axially arranged conical rubber-metal bushings, particularly bushings surrounded by tubes, and substantially consists therein that the two sleeves are provided with oppositely directed threads and held together by a turnbuckle having corresponding threads. In a simple manner it is hereby rendered possible to insert both rubber-metal bushings into the surrounding or enclosing tube from the ends thereof and to bring the ends of the bushings in the correct position with regard to each other by tightening the turnbuckle. The two outer metal sleeves may be extended for this purpose beyond the rubber bushings and to each other and provided at their extended ends with oppositely directed internal threads for receiving the turnbuckle adapted to be screwed into same. For the purpose of introducing a tool for tightening the turnbuckle, the casing, for instance the tube-like casing, supporting the rubber-metal bushings preferably is provided with corresponding slot-like openings, at least one such opening.

In the accompanying drawing one construction according to the invention is shown by way of example.

In this drawing:

Fig. 1 is a longitudinal section through a connection according to the invention, and Fig. 2 is a cross section through the connection shown in Fig. 1.

A shaft or tube $b$ indicated in dash- and dotted-lines in Fig. 1 is to be elastically journalled in an external tube-like casing $a$. The two conical rubber bushings $c$ are used for the connection, the smaller diameters of which are directed against each other so that they are particularly adapted to elastically absorb axially directed forces. Each of the sleeve-like rubber buffers is provided externally with a metal sleeve $d$ and internally with a metal sleeve $e$ connected for instance by vulcanization or by sticking. The ends of the metal sleeves $d$ facing each other are extended and provided with internal threads $f$, one of the sleeves being provided with a right-hand thread and the other with a left-hand thread. Between the two internal sleeves $e$, a distance sleeve $g$ is arranged. For connecting the two external metal sleeves $d$, a turnbuckle $h$ is provided according to the invention the outer surface of which carries right-hand and left-hand threads corresponding to the threads $f$.

To position the rubber sleeves in place, first the distance sleeve $g$ and the turnbuckle $h$ are axially introduced into the tube-like casing $a$ from the side thereof. Thereupon the two rubber bushings $c$ together with their metal sleeves $d$ and $e$ are introduced from both sides into the casing until they engage the threads $f$ of the turnbuckle $h$. For tightening the turnbuckle a tool, for instance a bolt $i$, is then introduced through a slot-like opening $k$, provided for this purpose in the casing $a$, and is brought into engagement with two oppositely arranged bores $l$ in the turnbuckle $h$, the bolt $i$ simultaneously being passed through slots $m$ provided in the distance sleeve $g$. By turning the tool $i$ in the direction of the arrow $o$ and by repeated insertion of the tool $i$ into the next following opening $l$, the turnbuckle $h$ is turned or screwed until the two conical metal sleeves $d$ firmly bear against the corresponding conical surfaces of the tube-like casing $a$.

On tightening of the turnbuckle the rubber-metal bushings preferably are prevented from rotating relatively to the casing $a$. Such locking of course may also remain effective after tightening of the turnbuckle.

The present invention renders superfluous space requiring screw devices at the ends of the rubber-metal bushings, as the connection of the bushings or the securing of the same in the casing respectively is effected in the space present in any case between the two rubber bushings $c$.

Instead of connecting the two external sleeves $d$ by the turnbuckle $h$, a turnbuckle for the internal metal sleeves $e$ may be provided in a similar manner. The turnbuckle $h$ in this case preferably is to be provided with internal threads.

In both cases it is possible to use internal or external threads.

When used for the resilient suspension of the axis of motor vehicles, the casing $a$ may for instance be connected to the frame of the vehicle and the shaft $b$ for instance to a supporting member for suspending the wheel. The arrangement may be chosen that the axis of the rubber bushings extends in a horizontal, a vertical or any desired other direction.

Having now particularly described and ascertained the nature of my said invention and in what manner the same is to be performed I declare that what I claim is:

1. A connecting device for detachably connecting two axially alined rubber-metal bushings, including means causing an internal and an external portion to exert pressure elastically against each other, comprising a pair of corresponding exterior metal sleeves forming the external portions individually mounted exteriorly upon the rubber portions of said bushings and having threaded portions at their mutually adjacent opposed ends, a pair of interior corresponding sleeves disposed within said rubber portions and forming the internal portions and a hollow turnbuckle member threaded at both ends, and by engaging with the threaded portions of said exterior sleeves so as to adjustably interconnect the same forming the exclusive means retaining the two exterior sleeves positively assembled.

2. A connecting device according to claim 1, having the threaded portions of the exterior sleeves provided with threads of opposite pitch simultaneously engaged by the threaded portions of the turnbuckle to connect and adjust said sleeves, the mutually opposed threaded ends of said sleeves extending inwardly a distance beyond the rubber portions of the rubber-metal bushings so as to project mutually toward each other.

3. A connecting device according to claim 1, having the threaded portions of the exterior sleeves disposed within their mutually opposed ends and of opposite pitch so as to be capable of receiving the threaded ends of the turnbuckle therein, said opposed ends of said sleeves projecting toward each other and extending a distance beyond or past the rubber portions of the rubber-metal bushings so as to provide clearance for the threaded portions within said ends.

4. A connecting device for detachably connecting two axially alined rubber-metal bushings, including means causing an internal and an external portion to exert pressure elastically against each other, comprising a pair of corresponding metal sleeves forming the external portions individually mounted exteriorly upon the rubber portions of said bushings and having threaded portions at their mutually opposed ends, and a hollow turnbuckle member threaded at both ends and engaging with the threaded portions of said sleeves so as to adjustably interconnect the same, the threaded portions of the sleeves being disposed within their mutually opposed ends and of opposite pitch so as to be capable of receiving the threaded ends of the turnbuckle therein, said opposed ends of the sleeves projecting toward each other and extending a distance beyond or past the rubber portions of the rubber-metal bushings so as to provide clearance for the threaded portions within said ends, and a casing for receiving and supporting the rubber-metal bushings and sleeves, the wall of said casing being pierced by an opening in the side thereof allowing access of a tool to the turnbuckle for partially rotating the same.

5. A connecting device according to claim 1, having the rubber-metal bushings and sleeves exteriorly frusto-conical with their smaller ends directed inwardly so as to be mutually opposed and their outer extreme ends flared, and having the device as a whole adapted to resiliently support within the interior sleeves an axle on a motor vehicle.

6. A connecting device according to claim 1, having the threaded portions of the exterior sleeves provided with threads of opposite pitch simultaneously engaged by the threaded portions of the turnbuckle to connect and adjust said sleeves, the mutually opposed threaded ends of said sleeves extending beyond the rubber portions of the rubber-metal bushings so as to project mutually toward each other, and having the rubber-metal bushings and sleeves exteriorly frusto-conical with their smaller ends directed inward so as to be mutually opposed and their outer extreme ends flared, and having the device as a whole adapted to resiliently support within the interior sleeves an axle on a motor vehicle.

7. A connecting device for detachably connecting two axially alined rubber-metal bushings, including means causing an internal and an external portion to exert pressure elastically against each other, comprising a pair of corresponding metal sleeves forming the external portions individually mounted exteriorly upon the rubber portions of said bushings and having threaded portions at their mutually opposed ends, and a hollow turnbuckle member threaded at both ends and engaging with the threaded portions of said sleeves so as to adjustably interconnect the same, the threaded portions of the sleeves being disposed within their mutually opposed ends and of opposite pitch so as to be capable of receiving the threaded ends of the turnbuckle therein, said opposed ends of the sleeves projecting toward each other and extending a distance beyond or past the rubber portions of the rubber-metal bushings so as to provide clearance for the threaded portions within said ends, the rubber-metal bushings and sleeves exteriorly frusto-conical with their smaller ends directed inward so as to be mutually opposed and their outer extreme ends flared, and the device as a whole being adapted to resiliently support an axle on a motor vehicle.

BÉLA BARÉNYI.